United States Patent [19]

Hammitt et al.

[11] Patent Number: 5,317,700

[45] Date of Patent: May 31, 1994

[54] PROGRAM HISTORY FOR PIPELINED PROCESSOR INCLUDING TEMPORARY STORAGE QUEUES FOR STORING BRANCH ADDRESSES

[75] Inventors: Gregory F. Hammitt, Eagan, Minn.; Scott D. Koenigsman, St. Joseph, Mich.

[73] Assignee: Unisys Corporation, Blue Bell, Pa.

[21] Appl. No.: 877,508

[22] Filed: May 1, 1992

[51] Int. Cl.$^5$ .................... G06F 9/38; G06F 11/30
[52] U.S. Cl. .................... 395/375; 395/575; 364/DIG. 1; 364/254.5; 364/255.8; 364/261.3; 364/266.6; 364/265.6
[58] Field of Search .................. 395/375, 575

[56] References Cited

U.S. PATENT DOCUMENTS 4,016,543  4/1977  Franks et al. ................ 364/200
4,176,394  11/1979  Kaminski et al. ............. 364/200

Primary Examiner—Lawrence E. Anderson
Attorney, Agent, or Firm—Glenn W. Bowen; Mark T. Starr

[57] ABSTRACT

A program history (P-history) listing of branch-type instruction addresses for pipelined data processing system that employs one or more pipelined processors is stored in a random access memory (RAM) which is also used to store other executive or task information. A set of three queue registers is used to respectively store, 1) the absolute "to" address to which a branch instruction will jump, 2) the relative "to" address, to which the branch instruction will jump, and 3) the relative "from" address, from which the branch instruction will jump. The queues allow the storage of the P-history in the RAM without interference with the use of the RAM by the other functions that access it and without interruption of the pipelined processor.

4 Claims, 2 Drawing Sheets

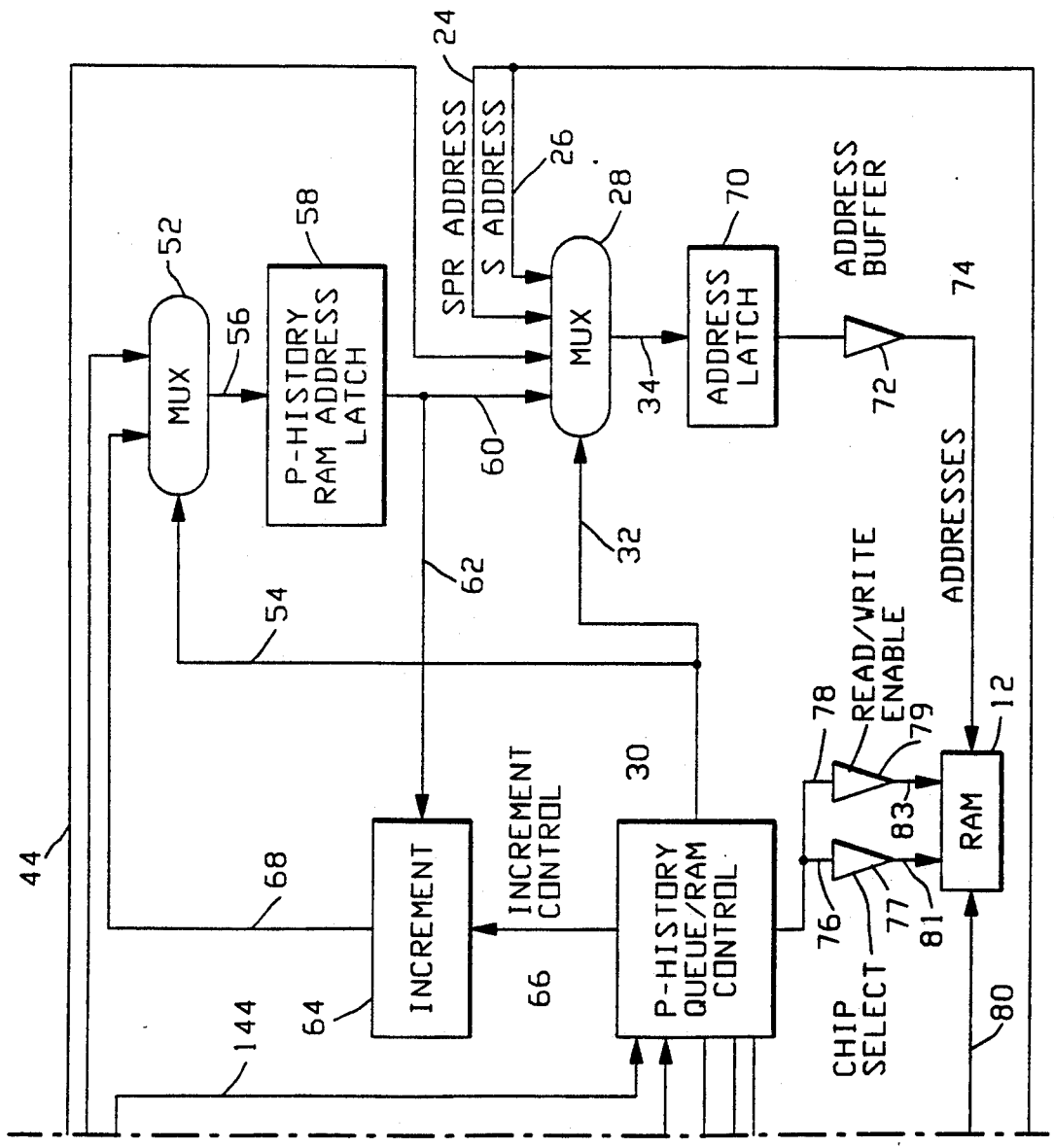

PROGRAM HISTORY FOR PIPELINED PROCESSOR INCLUDING TEMPORARY STORAGE QUEUES FOR STORING BRANCH ADDRESSES

The U.S. Government has a paid-up license in this invention and the right in limited circumstances to require the patent owner to license others on reasonable terms as provided for by the terms of Contract No. N00024-83-D-7038 awarded by the U.S. Navy.

BACKGROUND OF THE INVENTION

1. Field of the Invention

The invention is related to the storage of the program history of a digital computer in a memory, and particularly to the storage of branchtype instructions in a memory stack of a pipelined system with one or more processors.

2. Discussion of the Background Information

U.S. Pat. No. 4,016,543, issued Apr. 5, 1977 to Franks et al., entitled "Processor Address Recall System," disclosed a break-point function in connection with the memory stack for storing the addresses of the most recently executed instructions of a digital processor. The system of the Franks et al. patent is implemented by storing the addresses of all of the most recently executed instructions of a processor in a memory stack, and by pushing them down upon the execution of each instruction.

U.S. Pat. No. 4,176,394, issued Nov. 27, 1979 to David Kaminski et al., entitled "Apparatus for Maintaining a History of the Most Recently Executed Instructions in a Digital Computer," was a program history (P-history) system in which only the most recently executed branch-type instructions were stored in a memory stack. The stack was designated as a P-stack and was dedicated to the P-history function. The present invention is directed to a P-history storage system which may be used with a pipelined processor system with one or more pipelined processors without slowing down the operation of any of the processors, and which allows the P-history stack to be maintained in a random access memory (RAM) which may also be utilized for storage for other purposes on a shared basis.

SUMMARY OF THE INVENTION

A pipelined data processing system having one or more microprocessors that execute branch-type instructions and have microprogram control and a random access memory (RAM), including an improved program history function.

The program history is implemented with:

(a) a first queue temporary storage that stores the absolute "to" address to which a branch instruction will jump;

(b) a second queue temporary storage that stores the relative "to" address to which the branch instruction will jump;

(c) a third queue temporary storage that stores the relative "from" address from which the branch instruction will jump;

(d) a data multiplexor that couples the oldest address that is stored in each of said queue temporary storage means to the RAM as address data for storage in the RAM at addresses that are specified by said microprogram control means, and for receiving processing function data which are also stored in said RAM and which relate to other processing functions that can be performed by the processors;

e) address multiplexor coupled to the RAM and to the microprogram control to receive the address that was specified by the microprogram control and determine the address at which address queues will be stored in the RAM, and which also receives the addresses at which the processing function will be stored in the RAM; and (f) RAM control means that controls the writing of the address data and the processing function data at specified addresses of the RAM at controlled times that are determined by the processors and the microprogram control.

BRIEF DESCRIPTION OF THE DRAWINGS

The present invention is described by reference to the drawings in which:

FIG. 1 is a diagram which illustrates the spatial relationship of FIGS. 1a and 1b; and FIGS. 1a and 1b together form a block diagram of the P-history system of the present invention.

DESCRIPTION OF THE PREFERRED EMBODIMENT

Figure 1A:
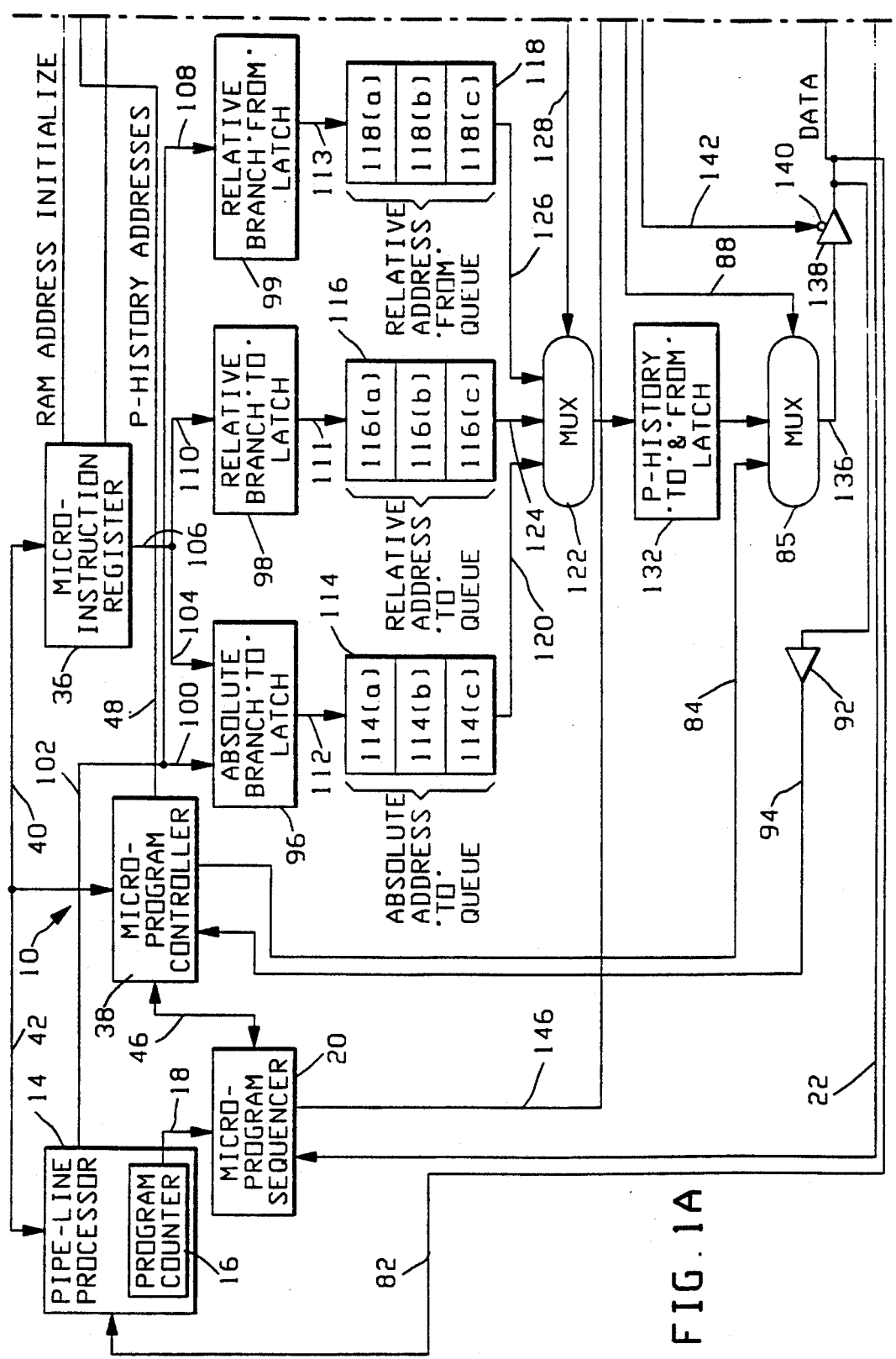

When errors occur in digital computing systems, the storage of a series of the last executed instructions are used to determine the source of the fault and whether it is a software fault or a hardware fault. This is of particular importance for multiprocessor systems which use pipelined processors.

Each digital processor will sequence through its instructions in consecutive order unless an instruction is executed which is a branch-type instruction which requires the processor to branch to a separate address to initiate a different sequence.

The Kaminski et al. patent recognized that all the addresses of all of the most recently executed instructions need not be stored. In the Kaminski et al. system branch-type instruction addresses only are retained since the execution sequence of consecutive instructions can be readily retraced. In this invention, like the Kaminski et al. system, only addresses of branch-type instructions are preferably maintained, although the system could be utilized for the maintenance of all of the instructions, if desired. By storing only branch-type instructions, more executed instructions are embraced within the program history tracking capability.

FIGS. 1a and 1b illustrate a block diagram of the pipelined processor and include the pipelined processor's program counter, its microprogram sequencer, its microprogram controller and its micro-instruction register. The invention may be utilized with a number of processors each of which comprise the same elements as the illustrated pipelined processor, and each of which are coupled to similar control elements. All of the pipelined processors of multiprocessor systems may share the random access memory (RAM) 12 which stores the P-history addresses as required to implement the present invention.

The P-history system 10 of the present invention uses the RAM 12 as the storage element for the P-history. Other functions also share the RAM in order to utilize it more efficiently. For example, in the illustrated system, the pipelined processor 14 may employ a number of base index or (B) registers (not shown), which are required when relative addressing is used. Some of these B registers will be used for task control and others for executive control. During relative addressing, an instruction will furnish a displacement address that is indexed by one of the B registers to form a relative address. A relative address is a memory address that is expressed by reference to an assigned base address. The relative address in the B register may then be added to the contents of one of a number of base or S registers (not shown) to determine the final operand address of the instruction.

The absolute instruction address is formed by adding the contents of the S register specified by the upper 12 bits of the program counter, or P register 16, of the pipelined processor 14 to the relative address that is specified by the lower 16 bits of the P-register. An absolute address specifies a storage location in memory without the use of any intermediate reference address and represents the address of a permanent location in memory. The S register addresses that are added to the B and P registers to obtain the operand address and instruction address in the present invention are also stored in the RAM 12.

It is common for pipelined processors to also contain a number of base protection registers (SPR) (not shown) some of which are associated with task processing functions, and others of which are associated with the executive processing functions. Data for these SPR registers are also stored in the RAM 12 in the present invention on a shared basis. In general, there is a one-for-one relationship between an S register and an SPR register. SPR registers are used to prevent data pointed to by a base register from being erroneously changed during processing.

The program counter 16, or P register, in the pipelined processor 14 is coupled on the line 18 to the microprogram sequencer 20 for the instruction processor 14. The microprogram sequencer supplies the S address and the SPR address on the bus 22 which is split into sub-buses 24 and 26 that are coupled to the multiplexor 28. The term "bus" means that more than one connecting line is required to achieve the described functions. The control signal for the multiplexor 28 is supplied by the P-history queue/RAM control unit 30 on the line 32 which determines which of the inputs to the multiplexor will be selected to supply the output line 34.

The microinstruction register 36, which is coupled to the microprogram controller 38 on the line 40 and to the pipelined processor 14 on the line 42, provides communication and control between these elements which allows the pipelined processor to perform its task and executive functions. The microinstruction register is also coupled on the bus 44 to the multiplexor 28 in order to supply a RAM address initialization signal which reads all zeros into all, or a portion, of the RAM and which establishes correct parity upon start-up. The microprogram controller 38 is coupled on the bus 46 to the microprogram sequencer 20 to enable it to cooperate in providing program control for the pipelined processor 14.

The microprogram controller 38 is also coupled on the bus 48 to the multiplexor 52 to provide data for the initialization of the P-history portion of the RAM 12. The control signal for the multiplexor 52 is supplied from the P-history queue/RAM control unit 30 on the line 54. The bus 48 supplies a P-history address update whenever the program sequence is to a branch address or there is a jump back to the original sequence or to a point in a loop. The P-history address on the bus 48 is passed through the multiplexor 52 on the bus 56 to the P-history RAM address latch 58 where it is temporarily stored. The output of the P-history RAM address latch 58 is supplied on the bus 60 to the multiplexor 28, and it is also supplied on the bus 62 to the incrementor 64. When the program steps without branching, each address in the P-history RAM address latch is updated by one after the P-history queue/RAM control 30 supplies a control signal on the line 66 to the increment circuit 64 that indicates that the next program execution step has been taken. This incremented program history address plus one (P+1) is sent on the bus 68 from the increment circuit 64 to the multiplexor 52 so that the multiplexor may now select either bus 48 or the bus 68 to be coupled to the bus 56.

After one of the addresses on the buses 24, 26, 44 of 60 is selected and passed through the multiplexor 28 to the bus 34, it is stored in the address latch 70. The output of the address latch 70 is transmitted to a set of address buffers 72, which provide the voltage translation required to interface with the RAM 12. The output signals of the set of address buffers 72 (only one buffer is shown for illustration purposes) are sent on the bus 74 to direct storage of path into the RAM 12 at the appropriate addresses. The P-history queue/RAM control unit 30 supplies power-on, or chip-select, signals on the control line 76 to the chip-select circuitry 77 which couples its output on lines 81 to the RAM 12. Read-/write enable signals are supplied on the line 78 to read-/write enable circuitry 79, which couples its output on lines 83 to the RAM 12 to enable writing into the RAM and reading out of the RAM, as desired. These signals are used to write in and read out information stored at the S and SPR addresses for task or executive control purposes and information specified by the P-history addresses for diagnostic purposes when an error occurs.

The data bus 80 coupled to the RAM 12 is a bidirectional bus which allows for data to be stored into the RAM 12 at a selected address, and for data to be read out of the RAM 12 on the bus 80 and supplied via bus 82 to the pipelined processor 14. Data may also be supplied through the buffer 92 via the bus 94 to the microprogram controller 38 to allow for control of the microprogram operation of the processor 14.

Data for the S and SPR functions are supplied by the microprogram controller 38 on the bus 84 to a multiplexor 85. The multiplexor 85 is controlled by the P-history queue/RAM control unit 30 through the control line 88. The P-history function is provided so that when instruction is executed, each instruction of a branch-type which is to be stored in the RAM 12 produces three words of P-history address information data that is stored at the address specified by the P-history RAM address latch 70. One word contains the absolute branch "to" address, that is the absolute address for the first instruction where the branch will begin. One word contains the relative "to" address, and one word contains the relative "from" address, which is retained to determine the address at which the program deviated from incremental execution. In other words, the jump instruction or the last instruction before an interrupt.

The absolute branch "to" address is retained in the single word latch 96, and the relative branch "to" and relative branch "from" addresses are retained in relative branch "to" and "from" latches 98, respectively. The absolute branch "to" latch 96 is coupled to the pipelined processor 96 over the bus 100 via the bus 102, and it is coupled to the microinstruction register 36 over the bus 104 via the bus 106. The relative branch "to" and relative branch "from" latches 98, 99 are coupled to the pipelined processor over the buses 108 and to the microinstruction register 36 over the bus 110. The output of the absolute branch "to" latch 96 is coupled on the bus 112 to the address "to" queue 114 which in the illustrated embodiment shows three queue stages, 114(a), 114(b) and 114(c). The number of stages that are used in the queues is determined by the applicable operating conditions of the specific implementation.

Separate queues are also provided for the relative branch "to" address and the relative branch "from" address. These are the queues 116 and 118 which also have three queue stages 116(a)–116(c) and 118(a)–118(c), respectively. The output of the queue 114 is supplied on the bus 120 to the multiplexor 122. The output of the queue 116 is supplied on the bus 124 to the multiplexor 122, and the output of the queue 118 is supplied on the bus 126 to the same multiplexor 122. The queues 114, 116, 118 are all first-in, first-out queues. Control for the multiplexor is supplied on the line 128 from the P-history queue/RAM control unit 30. The latches are loaded in the order latch 114, latch 116 and latch 118. They are read through the multiplexor 86 to the RAM 12 in the order latch 118, latch 114 and latch 116.

The selected output of the multiplexor 122 is supplied on the bus 30 to the P-history "to" and "from" latch 132 which temporarily stores information from the output stages 114(c), 116(c) or 118(c) of the queues that has last been selected. After this information is stored in the latch 132 from the queues 114, 116 and 118, they are available to receive and store new information on the buses 111, 112 and 113, which are associated with a new branch instruction in their input stages 114(a), 116(a) or 118(a), respectively. The queues 114, 116 and 118 allow the pipelined processor 14, or other associated processors that also share the RAM 12, to keep operating without being interrupted in order to service the P-history storage function.

The output of the P-history latch 132 is supplied on the bus 134 to the multiplexor 85. As previously mentioned, the multiplexor 85 is controlled by the control line 88 from the queue/RAM control unit 30. It selects whether the pipelined processor data on the bus 84, which supplies S and SPR data to the RAM 12 is to be selected, or if the P-history information stored in the latch 132 is to be selected. The output of the multiplexor 85 is supplied on the bus 136 to a set of controllable buffers 138 that couple information on the bus 80 for storage in the RAM 12. (Only one buffer is shown for illustration purposes.) The circle 140 is an indication that the buffers are inactive until a low logic level signal from the control unit 30 is supplied on the bus 142. Three-state control is required since the data bus 80 is a bidirectional bus. Thus, by sending control signals on the bus 142, data from the multiplexor 85 will be supplied on the data bus 80 at an appropriate time when there are also associated address signals present on the bus 74 that indicate where storage of the information on the data bus 80 should be made.

The P-history queue/RAM control unit that supplies the timing and control signals required to implement the present invention is coupled to the microinstruction register 36 to receive microinstruction information on the bus 144, and to the microprogram sequencer 20 on the bus 146 to receive microprogram sequence information on this bus. The control of the output signals in accordance with the microinstruction information and the microprogram sequencing information that are received by the control unit 30 allow it to provide the control signals that are dependent upon the particular operating and structural characteristics of the processing system in which the invention is embedded. The design of such controllers to tailor the invention to specific operating embodiments is implementable using techniques that are well known to those skilled in the art.

What is claimed is:

1. In a pipeline data processing system comprising processor means that execute branch-type instructions, program control means and a random access memory (RAM) coupled to said processor means and to said program control means for sorting processing function data for processes that are performable by said processor means, the improvement comprising a program history processing means which comprises:

(a) first queue temporary storage means coupled to said processor means and to said program control means for storing the absolute "to" address program history data to which a branch instruction will jump, (b) second queue temporary storage means coupled to said processor means and to said program control means for storing the relative "to" address program history data to which the branch instruction will jump, (c) third queue temporary storage means coupled to said processor means and to said program control means for storing the relative "from" address program history data from which the branch instruction will jump, (d) queue multiplexing means coupled to said RAM and to said first, second and third queue temporary storage means for transferring said program history data stored in said queue temporary storage means to said RAM in a first-in-first-out manner for storage in said RAM at program history addresses that are specified by said program control means, and for receiving said processing function data for storage in said RAM as processing function addresses, (e) address multiplexing means coupled to said RAM and to said program control means for receiving said program history addresses and said processing function addresses, and (f) RAM means comprising write means coupled to said processor means, and to said program control means and to said queue and address multiplexing means for controlling the writing of said program history data and said processing function data into said RAM at controlled times that are determined by said processor means and said program control means, whereby said first, second and third queue temporary storage means allow the storage of the program history in said RAM means without interference with the use of said RAM means by the other functions that access it and without interference with the pipelining of said processor means.

2. In the pipeline data processing system as claimed in claim 1, the further improvement wherein said address multiplexing means comprises:

(a) first address multiplexing station means having a plurality of inputs, one of which is an increment input and the other of which are address inputs that are coupled to said program control means for receiving said program history addresses from said program control means, wherein said first address multiplexing means is also coupled to said program control means for receiving control signals from said program control means for selecting said program history addresses, (b) program history address storage latch means coupled to receive said output from said first address multiplexing station means and to receive said program history addresses from said program control means, (c) incrementing means coupled to said increment input of said first address multiplexing system for selectively adding a "1" to the program history addresses stored in said program history address storage latch means and for supplying said incremented addresses to said increment input, said incrementing means also being coupled to said program control means for receiving an increment control signal that directs the time at which said incrementing means shall add said "1" to said program history addresses, and (d) second address multiplexing station means coupled to said program history address storage latch means and having address input for receiving said program history addresses stored in said address latch means, to said program control means for receiving program history addresses to said program control means for receiving control signals from said program control means and to said RAM for selectively coupling said program history addresses to said RAM.

3. In the pipeline data processing system as claimed in claim 1, the improvement wherein said queue multiplexing means comprises:

(a) first queue multiplexing station means having a plurality of inputs, one each of said inputs being individually coupled to one of said first, second and third queue temporary storage means for individually receiving program history data from said first, second and third queue temporary storage means and to said program control means for receiving control signals from said program control means, (b) program history queue storage latch means coupled to said first queue multiplexing station means for selectively program history data on each of said inputs on a first-in-first-out basis from the respective one of said first, second and third queue temporary storage means which is coupled to said input, wherein said program history data storage latch means receives said program history data through said queue multiplexing means for storage in said RAM, and (c) second queue multiplexing station means coupled to said program history data storage latch means for receiving program history data stored in said program history data storage latch means to said program control means for receiving program history addresses, to said program control means for receiving control signals from said program control means, and to said RAM for selectively coupling program history data stored in said program history data storage latch means for storage in said RAM.

4. In the pipeline data processing system as claimed in claim 3, the further improvement wherein said address multiplexing means comprises:

(a) first address multiplexing station means having a plurality of inputs, one of which is an increment input and the other of which are address inputs that are coupled to said program control means for receiving said program history addresses from said program control means, wherein said first address multiplexing means is also coupled to said program control means for receiving control signals from said program control means for selecting said program history addresses, (b) program history address storage latch means coupled to receive said output from said first address multiplexing station means and to receive said program history addresses from said program control means, (c) incrementing means coupled to said increment input of said first address multiplexing system for selectively adding a "1" to the program history addresses stored in said program history address storage latch means and for supplying said incremented addresses to said increment input, said incrementing means also being coupled to said program control means for receiving an increment control signal that directs the time at which said incrementing means shall add said "1" to said program history addresses, and (d) second address multiplexing station means coupled to said program history address storage latch means and having address input for receiving said program history addresses stored in said address latch means, to said program control means for receiving program history addresses to said program control means for receiving control signals from said program control means and to said RAM for selectively coupling said program history addresses to said RAM.

* * * * *

UNITED STATES PATENT AND TRADEMARK OFFICE
CERTIFICATE OF CORRECTION

PATENT NO. : 5,317,700
DATED : May 31, 1994
INVENTOR(S) : Gregory F. Hammitt, Scott D. Koenigsman It is certified that error appears in the above-identified patent and that said Letters Patent is hereby corrected as shown below:

Column 7, line 44, after "selectively" insert -- receiving -- .

Signed and Sealed this

Thirteenth Day of September, 1994

Attest:

Attesting Officer

BRUCE LEHMAN
Commissioner of Patents and Trademarks